United States Patent [19]

Hoover et al.

[11] Patent Number: 5,110,901
[45] Date of Patent: May 5, 1992

[54] HIGHER MOLECULAR WEIGHT ARYLENE SULFIDE RESIN AND PROCESS FOR ITS PREPARATION

[75] Inventors: Kenneth C. Hoover, Tulsa; Earl Clark, Jr., Bartlesville; Roy E. Reger; Lacey E. Scoggins, both of Bartlesville, all of Okla.; Afif M. Nesheiwat, Madison, N.J.

[73] Assignee: Phillips Petroleum Company, Bartlesville, Okla.

[21] Appl. No.: 580,720

[22] Filed: Sep. 11, 1990

Related U.S. Application Data

[63] Continuation-in-part of Ser. No. 284,170, Dec. 13, 1988, abandoned.

[51] Int. Cl.$^5$ ............................................. C08G 75/14
[52] U.S. Cl. ..................................... 528/387; 528/388
[58] Field of Search ................................. 528/387, 388

[56] References Cited

U.S. PATENT DOCUMENTS

| | | | |
|---|---|---|---|
| 4,116,947 | 9/1978 | Edmonds, Jr. et al. | 528/388 |
| 4,350,810 | 9/1982 | Tieszen et al. | 528/388 |
| 4,786,712 | 11/1988 | Ostlinning et al. | 528/388 |

Primary Examiner—John Kight, III
Assistant Examiner—T. Mosley
Attorney, Agent, or Firm—Phillips Petroleum Co.

[57] ABSTRACT

In a first embodiment, arylene sulfide resins are provided by contacting, in a polymerization mixture, during a polymerization process, reactants comprising: an alkali metal sulfide, an organic amide, an alkali metal carboxylate, water and a monomer source which comprises at least one dihaloaromatic compound. The amount of alkali metal carboxylate present during the polymerization process ranges from about 0.01 to about 0.03 mole per each mole of sulfur present in the resulting arylene sulfide resin. The total amount of water present during the polymerization process ranges from about 1.02 to about 2.1 moles per each mole of sulfur present in the resulting arylene sulfide resin.

In a second embodiment, arylene sulfide resins are provided by contacting, in a polymerization mixture, during a polymerization process, reactants comprising: an alkali metal sulfide, an organic amide, an alkali metal carboxylate, water and a monomer source which comprises a mixture of at least one dihaloaromatic compound and at least one polyhaloaromatic compound having more than two halogen substituents per molecule. The ranges of the amount of alkali metal carboxylate present during the polymerization process and the total amount of water present during the polymerization process are identical to those amounts disclosed in the first embodiment. The amount of polyhaloaromatic compound initially present ranges from about 0.0001 to about 0.01 mole per each mole of dihaloaromatic compound present prior to the initiation of the polymerization process.

58 Claims, No Drawings

HIGHER MOLECULAR WEIGHT ARYLENE SULFIDE RESIN AND PROCESS FOR ITS PREPARATION

CROSS REFERENCE TO RELATED APPLICATIONS

This application is a continuation-in-part of application Ser. No. 284,170, filed Dec. 13, 1988, now abandoned.

FIELD OF THE INVENTION

This invention pertains to high molecular weight arylene sulfide polymers prepared by employing at least one molecular weight increasing agent.

BACKGROUND OF THE INVENTION

Arylene sulfide resins, ranging in consistency from viscous liquids to crystalline solids, are known in the art. While such polymers exhibit desirable properties, the unmodified, uncured, moderately branched to linear (i.e., virgin) arylene sulfide resins normally have associated therewith relatively high melt flow values (e.g., above about 4,000 grams of extrudate collected over a 10 minute time interval, as measured by ASTM D1238, Procedure B). The relatively high melt flow values of these virgin resins inhibit their use in many commercial applications.

One example of a commercial process which can be inhibited by using arylene sulfide resins having associated therewith high melt flow values is that wherein the resin is used to make polymeric composite material. Polymeric composite material is made by combining, with the arylene sulfide resin while in a melted phase, various reinforcing materials (e.g., fibrous reinforcements) and/or fillers. After being prepared, the polymer composite material is then often sent for further processing into a final or intermediate molded product. This latter processing step often requires that the polymer composite material be heated to a temperature above the melting point of the arylene sulfide resin used in its preparation.

The relatively high melt flow values (i.e., low melt viscosity), of virgin arylene sulfide polymers, often make it difficult to handle these resins by conventional practices. For example, when exposed to processing temperatures above their respective melting point, it becomes very difficult to process virgin arylene sulfide polymers with standard techniques and/or apparatuses. However, since arylene sulfide polymers possess many desirable properties which make them extremely useful, it would be advantageous to improve their processability without materially degrading any of their desirable properties.

One technique of improving the processability of virgin arylene sulfide resins is to oxidatively cure the virgin resins. Since oxidative curing processes typically consist of exposing a particulate virgin resin to an oxidizing atmosphere, while being heated to an elevated temperature below the resin's melting point, this process is often referred to as "solid-state" curing.

While solid-state curing a virgin arylene sulfide resin does result in decreasing the resin's melt flow value (i.e., increasing its melt viscosity), this process detrimentally affects some of the resin's mechanical and/or physical properties. Specifically, some of the detrimental effects of solid-state curing process are a substantial darkening of the resin's natural color and/or a reduction in the impact strength of material prepared from employing the resin.

Therefore, for some commercial applications, it would be desirable to have a process which decreases the melt flow value (i.e., increases the viscosity) of virgin arylene sulfide resins without implementing a solid-state curing process. Accordingly, one object of this invention is to provide a process for preparing arylene sulfide resins, having associated therewith low melt flow values, without employing a solid-state curing process.

Another technique for improving the processability of an arylene sulfide resin is demonstrated in U.S. Pat. No. 4,116,947, henceforth Patent '947. Specifically, Patent '947 discloses, among other things, methods to improve processability of arylene sulfide resins by employing, during the polymerization process, a polyhaloaromatic compound having more than two halogen substituents per molecule. This process results in branched, high molecular weight arylene sulfide resins. According to Patent '947, the gram-moles of the polyhaloaromatic compound present during polymerization, for each gram-mole of the dihaloaromatic compound present during polymerization, range from about 0.00002 to about 0.014 gram-mole, preferably, from about 0.001 to about 0.012 gram-mole. The arylene sulfide resins modified by the process disclosed in Patent '947 have significantly higher molecular weights and significantly lower melt flow values than their unmodified counterparts.

Although the polymers, made by the inventive process disclosed in Patent '947, have associated therewith many commercially desirable physical and mechanical properties, it is often desirable to produce high molecular weight arylene sulfide resins, having inherently associated therewith low melt flow values, which contain a lesser degree of branched polymeric chains. However, if this is accomplished by merely employing a lesser amount of the polyhaloaromatic compound, this will also result with forgoing some of the improvements in processability. Accordingly, another object of this invention is to provide high molecular weight arylene sulfide resins which, while having associated therewith the desired improvement in processability (i.e., low melt flow values), contain a lesser degree of branched polymeric chains.

Yet another technique for improving the processability of arylene sulfide resins is demonstrated in U.S. Pat. No. 3,919,177, henceforth Patent '177. Specifically, Patent '177 discloses, among other things, methods to improve the processability of arylene sulfide resins by employing, during the polymerization process, an alkali metal carboxylate. According to Patent '177, the gram-moles of alkali metal carboxylate present during polymerization, for each gram-mole of dihaloaromatic compound present during polymerization, ranges from about 0.05 to about 4 gram-moles, preferably, from about 0.1 to about 2 gram-moles. The arylene sulfide resins prepared by the process disclosed in Patent '177 have significantly higher molecular weights and significantly lower melt flow values in uncured form than do their uncured counterparts prepared without the use of the alkali metal carboxylate modifier of the process in Patent '177.

While polymers made by the inventive process disclosed in Patent '177 have associated therewith many commercially desirable physical and mechanical properties, polymers with properties superior to those prepared by the process therein would be even more desirable. Accordingly, yet another object of this invention is to provide high molecular weight arylene sulfide resins, prepared by the addition of at least an alkali metal carboxylate, having properties which are superior to those of resins produced in accordance with the process disclosed in Patent '177.

Although polymers made in accordance with the process disclosed in Patent '177 have associated therewith many commercial desirable properties, depending upon process employed to recover these resins from their respective polymerization reaction mixture, a processing problem can arise. Specifically, when these polymers are recovered by the process wherein the polymerization reaction mixture effluent, comprising the arylene sulfide resin, unreacted monomer, organic amide, water, and various solid and liquid by-product materials, is transported across a flash valve which rapidly reduces the pressure exerted on the reaction mixture effluent, thus resulting in separating the solidified resin from a substantial portion of the remaining liquid components (i.e., often referred to as a "flash" process), the recovered resin is generally in the form of feathery particles having a relatively low bulk density (i.e., generally less than about 15 lbs/ft$^3$). This feathery resin material filters slowly and thus, hampers the polymer's filtering, washing and processability.

Filtering, washing and processing arylene sulfide resins, having associated therewith low bulk densities, are extremely difficult. For example, extreme difficulty is often experienced when feeding an extruder with resins having low bulk densities. Efforts to force feed extruders with an auger-fed hopper or to compact the powder with a heated two-roll mill do not overcome these difficulties. Furthermore, the fine particle size of low bulk density arylene sulfide resins introduces non-systematic errors when determining the resin's flow characteristics.

In view of the above, a process which increases the bulk density of high molecular weight arylene sulfide resins, prepared by the addition, during polymerization, of at least an alkali metal carboxylate, would result in greatly improving the filterability, washability and processability of these resins. Therefore, still another object of this invention is to provide high molecular weight arylene sulfide resins having increased bulk densities.

Other aspects, concepts and objects of this invention will become apparent from the following detailed description and appended claims.

STATEMENT OF THE INVENTION

This invention discloses novel high molecular weight arylene sulfide resins, prepared by the addition of at least one molecular weight increasing agent, having associated therewith increased bulk densities and decreased melt flow values (i.e., increased viscosities).

In accordance with a first embodiment of the present invention, a novel arylene sulfide resin is provided by contacting, in a polymerization mixture, during a polymerization process, reactants comprising: an alkali metal sulfide, an organic amide, an alkali metal carboxylate, water and a monomer source which comprises at least one dihaloaromatic compound. In this embodiment, the amount of alkali metal carboxylate present prior to or during the polymerization process ranges from about 0.01 to about 0.03 mole for each mole of sulfur present in the resulting resin; and, the total amount of water present during the polymerization process ranges from about 1.02 mole to about 2.1 moles for each mole of sulfur present in the resulting resin.

In accordance with a second embodiment of the present invention, a novel arylene sulfide resin is provided by contacting, in a polymerization mixture, during a polymerization process, reactants comprising: an alkali metal sulfide, an organic amide, an alkali metal carboxylate, water and a monomer source which comprises a mixture of at least one dihaloaromatic compound and at least one polyhaloaromatic compound having more than two halogen substituents per molecule. In this latter embodiment, the ranges of the amount of alkali metal carboxylate present prior to or during the polymerization process and the total amount of water present during the polymerization process are the same as those amounts of the first embodiment; and, the amount of polyhaloaromatic compound initially present ranges from about 0.0001 to about 0.01 mole for each mole of dihaloaromatic compound present prior to the polymerization process.

A more complete appreciation of the invention and many attendant advantages thereof will be readily obtained as the same becomes better understood by reference to the following Detailed Description.

DETAILED DESCRIPTION

The terms "arylene sulfide polymer" and "arylene sulfide resin", are used interchangeably and are intended to include polymers of the type which can be represented as having been prepared by reacting polyhaloaromatic compounds with a sulfur source while in the presence of an organic amide which can function as a solvent. The resulting polymers contain the aromatic structure of the polyhalo compound coupled in repeating units through a sulfur atom. Similar polymers, prepared by other processes, are also considered to be encompassed by the above terms.

Generally, the novel arylene sulfide resins provided by this invention are those having the repeating unit R-S wherein R is selected from the group consisting of phenylene, biphenylene, naphthylene, biphenylene ether, or a lower alkyl-substituted derivative thereof. The phrase "lower alkyl", as used above, refers to alkyl groups having one to six carbon atoms. Examples of such lower alkyls include, but are not limited to, methyl, propyl, isobutyl, n-hexyl, and the like. Moreover, the preferred novel PAS resins provided by this invention generally have melting points about 200° C. (392° F.). Preferably, their melting points range from about 200° C. (392° F.) to about 500° C. (932° F.). Examples of arylene sulfide resins, provided by this invention, include, but are not limited to, poly(arylene sulfide), poly(arylene sulfide ketone) and poly(arylene sulfide diketone).

Although other arylene sulfide polymers are not excluded, in general, the novel arylene sulfide resins provided by this invention, are those wherein the arylene group is a phenylene group. Examples of novel phenylene sulfide resin provided by this invention include, but are not limited to, poly(phenylene sulfide), poly(biphenylene sulfide), poly(phenylene sulfide ketone), and poly(phenylene sulfide diketone).

The term "virgin", when used to identify a type of arylene sulfide resin, refers to a moderately branched to linear, low molecular weight resin which has not been subjected to any oxidative heat treatment (i.e., curing) and wherein no molecular weight increasing agents (e.g., alkali metal carboxylates and/or polyhaloaromatic compounds having more than two halogen substituents per molecule) were present during the polymerization process.

As used herein, the terms "melt flow" and/or "flow rate" are used interchangeably and refer to the rate at which a melt arylene sulfide resin flows through an orifice, having a specific diameter and length, when subjected to a specified downward pressure. Flow rate is recorded in units of grams of extrudate which have flowed through the orifice over a ten minute time interval (g/10 min.) and is based on a modified version of ASTM D1238 Procedure B. The modification employed is that the initial preheating time is five minutes, as opposed to the minimum six minute period which ASTM D1238 Procedure B specifies. It should be noted that high melt viscosity (i.e., high molecular weight) polymers have low melt flow values, and vice-versa. In other words, the terms "melt flow" and "melt viscosity" are inversely related.

As used herein, the term, "bulk density" refers to the density of a dried granular polymeric resin as determined by completely filling a container, having a known volume and weight, to its brim, with the polymer to be tested. The bulk density of the specific polymer is calculated after measuring the weight of the polymer in pounds (lbs) as a function of the volume of the test container in cubic feet ($ft^3$).

Bulk density of dried granular polymeric resins can be determined in terms of a "loose" bulk density and/or a "compacted" bulk density. The loose bulk density of a polymeric resin is determined by measuring the weight of the polymer, as it naturally fills the test container to its brim. On the other hand, the compacted bulk density of a polymeric resin is determined by physically compacting the polymer in the test container, until the compacted polymer reaches the brim thereof, prior to weighing the amount of polymer contained therein.

In accordance with a first embodiment of the invention, novel arylene sulfide resins are provided by contacting, in a polymerization mixture, during a polymerization process, reactants comprising: an alkali metal sulfide, an organic amide, an alkali metal carboxylate, water and a monomer source which comprises at least one dihaloaromatic compound. The amount of alkali metal carboxylate present prior to or during the polymerization process, when practicing this first embodiment, generally ranges from about 0.01 to about 0.03 mole for each mole of sulfur present in the resulting resin. The total amount of water present during the polymerization process, when practicing this first embodiment, generally ranges from about 1.02 to about 2.1 moles for each mole of sulfur present in the resulting resin; preferably, from about 1.05 to about 2.0 mole.

In accordance with a second embodiment of the invention, novel arylene sulfide resins are provided by contacting, in a polymerization mixture, during a polymerization process, reactants comprising: an alkali metal sulfide, an organic amide, an alkali metal carboxylate, water and a monomer source which comprises a mixture of at least one dihaloaromatic compound and at least one polyhaloaromatic compound having more than two halogen substituents per molecule. The general and preferred ranges of the amounts of alkali metal carboxylate present prior to or during the polymerization process and the total amount of water present during the polymerization process, when practicing this second embodiment, are identical to those disclosed for practicing the first embodiment. The amount of polyhaloaromatic compound initially present when practicing this second embodiment, generally ranges from about 0.0001 to about 0.01 mole for each mole of dihaloaromatic compound present prior to the polymerization process; preferably, from about 0.001 to about 0.008 mole.

The alkali metal sulfide present during the polymerization process of either of the above embodiments can result from either (1) an alkali metal sulfide being charged to the polymerization mixture prior to the polymerization process or (2) a reaction between a suitable sulfur source and a suitable caustic material prior to or during the polymerization process.

Examples of alkali metal sulfides, which can be charged to the polymerization mixture prior to the polymerization process include, but are not limited to, sodium sulfide, potassium sulfide, rubidium sulfide, cesium sulfide and mixtures thereof. The alkali metal sulfide can be used (1) in the anhydrous form, (2) as a hydrate, or (3) as an aqueous mixture or solution.

As stated above, the alkali metal sulfide present during the polymerization process can also result from a reaction between a suitable sulfur source and a suitable base.

Examples of such suitable sulfur sources include, but are not limited to, alkali metal hydrosulfides, thiosulfates, which include those of lithium, sodium, potassium, rubidium, cesium, magnesium, calcium, strontium, barium, hydrogen sulfide, carbon disulfide, N-methyl pyrrolidine-2-thione, thiolacetic acid and mixtures thereof. These sulfur sources must react, either prior to or during the polymer reaction process, with a suitable base to result in the alkali metal sulfide present during the polymerization process. Examples of such suitable bases include, but are not limited to, sodium hydroxide, lithium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the hydroxide can be produced in situ by the reaction of the corresponding oxide with water. Although the quantity of the base which is reacted with the sulfur source to result in the alkali metal sulfide differs with the specific sulfur source employed, the amount of base employed generally ranges from about the stoichiometric amount to about 0.75 mole in excess thereof of each mole of sulfur present in the resulting resin. Preferably, the amount of base employed ranges from about the stoichiometric amount to about 0.5 mole in excess thereof; more preferably, from the stoichiometric amount to about 0.25 mole in excess thereof.

Organic amides which can be present during the polymerization process should be substantially liquid at the polymerization reaction temperatures and pressures. The organic amides can be cyclic or acyclic and can have from about 1 to about 10 carbon atoms per molecule. Examples of suitable organic amides include, but are not limited to, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone (NMP), N,N'-ethylenedi-2-pyrrolidone, hexamethylphosphoramide, tetramethylurea, and mixtures thereof. NMP is the presently preferred organic amide.

Alkali metal carboxylates must be present in the polymerization reaction mixture during the polymerization, however, they may be contacted with the polymerization mixture prior to actual polymerization. The alkali metal carboxylates can be represented by the formula:

RCO$_2$M where R is a hydrocarbyl radical, having from 1 to about 20 carbon atoms, selected from alkyl, cycloalkyl and aryl compounds; and, where M is an alkali metal selected from the group consisting of lithium, sodium, potassium, rubidium and cesium. Preferably, R is an alkyl radical having 1 to about 6 atoms or a phenyl radical; and, M is lithium or sodium.

Examples of suitable alkali metal carboxylates, include, but are not limited to, lithium acetate, sodium acetate, potassium acetate, lithium propionate, sodium propionate, lithium-2-methylpropionate, rubidium butyrate, lithium valerate, sodium valerate, cesium hexanoate, lithium heptanoate, lithium-2-methyloctanoate, rubidium 4-ethyltetradecanoate, sodium octadecanoate, sodium heneicosanoate, lithium cyclohexanecarboxylate, cesium cyclododecanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and mixtures thereof. Sodium acetate is the presently preferred alkali metal carboxylate.

The monomer source present in the polymerization reaction mixture prior to the polymerization process can comprise either (1) at least one dihaloaromatic compound or (2) a mixture of at least one dihaloaromatic compound and at least one polyhaloaromatic compound, wherein at least one polyhaloaromatic compound has more than two halogen substituents per molecule.

Dihaloaromatic compounds which can be employed when practicing this invention can be represented by the following formula:

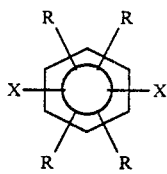

where each X is selected from the group consisting of chlorine, bromine and iodine; and, where each R is selected from the group consisting of hydrogen and hydrocarbyl. The total number of carbon atoms in each molecule of the above formula is generally within the range from 6 to about 24.

Examples of suitable dihaloaromatic compounds, include, but are not limited to, 1,4-dichlorobenzene (DCB), 1,4-dibromobenzene, 1,4-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-benzyl-2,5-dichlorobenzene, 1-octyl-4-(3-methylcyclopentyl)-2,5-dichlorobenzene, 1,3-dichlorobenzene, 1,2-dibromobenzene, 1-chloro-3-iodobenzene, 2,4-dichlorotoluene, and mixtures thereof. DCB is the presently preferred dihaloaromatic compound.

Polyhaloaromatic compounds having more than two halogen substituents per molecule which can be employed when practicing this invention can be represented by the formula:

R'X$_n$ where X is selected from the group consisting of chlorine, bromine, and iodine; where n is an integer of 3 to 6; and, where R' is a polyvalent aromatic radical of valence n which can have up to about 4 methyl substituents. The total number of carbon atoms in R' is within the range of 6 to about 16.

Examples of suitable polyhaloaromatic compounds include, but are not limited to, 1,2,3-trichlorobenzene, 1,2,4-trichlorobenzene (TCB), 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetraiodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and mixtures thereof. TCB is the presently preferred polyhaloaromatic compound.

It is within the scope of the second embodiment of this invention to introduce the polyhaloaromatic compound any time prior to the termination of the polymerization process. Generally, the polyhaloaromatic compound is added into the polymerization reaction mixture prior to 95 percent completion of the polymerization process; preferably prior to 75 percent completion; more preferably, prior to 50 percent completion. It is also within the scope of the second embodiment of this invention to introduce the polyhaloaromatic compound prior to the initiation of the polymerization process.

When practicing either embodiment of the invention it is necessary to control the total amount of water present during the polymerization process. Specifically, as stated earlier, the total amount of water necessary when practicing either embodiment of this invention generally ranges from about 1.02 to about 2.1 moles of water per mole of sulfur present in the resulting resin; preferably, from about 1.05 to about 2.0 moles of water.

The total amount of water present during the polymerization reaction is the molar sum of (1) the moles of water present in the polymerization reaction mixture prior to the polymerization process, (2) the moles of water charged to the polymerization reaction mixture prior to the polymerization process, and (3) the moles of water produced during the polymerization process.

The moles of water produced, if any, during the polymerization process is dependent upon the particular polymerization recipe employed. For example, during the polymerization process, wherein the alkali metal sulfide present therein is a result of a reaction between one of the aforementioned suitable sulfur sources and one of the aforementioned suitable bases, approximately 1 mole of water is produced, during the polymerization process, for each mole of sulfur present in the resulting resin.

After making the above consideration, the concentration of water present during the polymerization process can be adjusted by any suitable technique known by one skilled in the art. One such suitable method of obtaining the desired level of water is by a controlled dehydration process of the polymerization reaction mixture prior to initiating the polymerization process. Another method of obtaining the desired amount of water is by the addition of water to the polymerization reaction mixture after the polymerization reaction mixture has been dehydrated, if necessary, but before the polymerization process has been terminated. If water is added after the polymerization process has begun, it is presently preferred that the appropriate amount of water be added to the polymerization reaction mixture before about 95 percent of the polymerization process has been reached; preferably, before about 75 percent of the polymerization process; more preferably, before about 50 percent of the polymerization process.

Suitable polymerization process conditions for practicing this invention can vary over a wide range. Generally, however, the polymerization process conditions will fall within the following specified ranges. The polymerization process temperature will generally be within the range from about 180° C. (356° F.) to about 285° C. (545° F.); preferably, within the range from about 190° C. (374° F.) to about 275° C. (527° F.). Although the polymerization process time can vary greatly, depending in part on the reaction temperature, it will generally be within the range from about 1 hour to about 60 hours; preferably, within the range from about 2 hours to about 10 hours.

In a presently preferred procedure, the polymerization process is conducted within a first temperature range of about 180° C. (356° F.) to about 245° C. (473° F.); preferably, from about 190° C. (374° F.) to about 245° C. (473° F.), and then within a second temperature range of about 245° C. (473° F.) to about 275° (527° F.); preferably, from about 266° C. (510° F.) to about 275° C. (527° F.). The total polymerization process time for this presently preferred method ranges from about 1 hour to about 60 hours; preferably, from about 2 hours to about 10 hours. In this presently preferred polymerization process method, the reaction times are dependent, in part, on the reaction temperatures. In either or both of the temperature ranges, the temperature can be increased continuously or maintained predominantly at selected levels within relatively restricted temperature limits.

The pressure component of the polymerization process is autogenous and should be sufficient to maintain the monomer source and any water contained within the reaction mixture substantially in the liquid phase.

The processes of this invention can be carried out by contacting, in a polymerization reaction mixture, during a polymerization process, reactants comprising the alkali metal sulfide (or the sulfur source and the base resulting therein), the organic amide, the appropriate amount of alkali metal carboxylate, the appropriate amount of water, the dihaloaromatic compound and the appropriate amount of polyhaloaromatic compound (if any) having more than two halogen substituents per molecule. These reactants can be introduced into the polymerization reaction mixture in any order. Although the polyhaloaromatic compound having more than two halogen substituents per molecule can be charged to the polymerization reaction mixture at substantially the same time as the dihaloaromatic compound, it is also within the scope of this invention to add the polyhaloaromatic compound, either incrementally or all at once, to the polymerization reaction mixture during the course of the polymerization process.

The novel arylene sulfide resins provided by this invention can be separated from the polymerization reaction mixture, after the polymerization process is completed, by any procedure known by those skilled in the art.

The melt flow values of the novel arylene sulfide resins provided by this invention will generally be less than about 1000 g/10 min. Preferably, the melt flow values of these resins will range from about 5 to about 700 g/10 min.; more preferably, from about 10 to about 500 g/10 min.

The loose bulk density of the novel arylene sulfide resins provided by this invention will generally be greater than about 20 lb/ft$^3$; preferably, greater than about 25 lb/ft$^3$.

The novel arylene sulfide resins provided by this invention can be extruded into sheet, film, pipe or profiles; spun into fibers; or, blow molded, injection molded, rotational molded or compression molded into desired shapes. These novel resins can also be used in the production of coatings.

If desired, the novel arylene sulfide resins can be blended with additive material such as fibrous materials, fillers, pigments, extenders, other polymers, and the like or mixtures thereof. For example, fiberglass can be added to the novel resin to improve physical properties such as tensile strength, flexural modulus, and impact resistance. If desired, the novel resins, when in shaped form, can be annealed to improve physical properties such as flexural modulus, flexural strength, tensile strength and heat deflection temperature.

This invention will be more fully understood from the following examples. These examples are only intended to demonstrate select embodiments of the invention and are, in no way, intended to limit the scope thereof.

EXAMPLE I

This example demonstrates a process for preparing a novel polymeric resin by employing low levels of an alkali metal carboxylate and low levels of a polyhaloaromatic compound having more than two halogen substituents per molecule. The alkali metal carboxylate employed in this example was sodium acetate. The polyhaloaromatic compound employed in this example was 1,2,4-trichlorobenzene (TCB).

The novel arylene sulfide polymer resins prepared in this example was a poly(phenylene sulfide) (i.e., PPS) resin. The novel process in which the PPS was prepared is as follows.

Into a steam-heated mixing vessel (i.e., Vessel 1), 71.7 pounds of a 49.9 weight percent aqueous sodium hydroxide solution and 86.2 pounds of an aqueous solution, containing 60.2 weight percent sodium hydrosulfide and 0.2 weight percent sodium hydroxide, were charged.

To a dehydration/polymerization vessel (i.e., Vessel 2), 17.7 gallons of N-methyl-2-pyrrolidone (i.e., NMP) and 2.0 pounds of sodium acetate were then charged.

The contents of Vessel 1 were thoroughly mixed and subsequently flushed into Vessel 2 using 17 gallons of NMP. Vessel 2 was then sealed.

While stirring, Vessel 2 was heated to 304° F. The contents therein were then permitted to reflux to insure a proper mixing. After the refluxing period, the contents of Vessel 2 were dehydrated by heating the Vessel to 401° F. and venting the overhead vapors over a 75 minute period. The overhead vapors were then condensed, collected and weighed. The amount of overhead collected, which comprised predominantly water and NMP, weighed approximately 64 pounds.

After the dehydration process, the internal temperature of Vessel 2 was increased to 414° F. at which time 133.7 pounds of 1,4-dichlorobenzene, 0.5 pounds of TCB and 2 gallons of NMP were charged therein. The contents of Vessel 2 were then heated at a rate of approximately 1.5° F./minute until the final internal temperature and pressure of Vessel 2 reached 440° F. and 88 psig, respectively. The contents of Vessel 2 were maintained at this temperature and pressure for approximately 240 minutes.

After the 240 minute hold period, 3.35 pounds of water was added and the contents of Vessel 2 were heated at a rate of approximately 3° F./minute until the final internal temperature and pressure of Vessel 2 reached approximately 509° F. and 212 psig, respectively. The contents of Vessel 2 were maintained at this temperature and pressure for approximately 90 minutes.

After the 90 minute hold period, the contents of Vessel 2 were concentrated by venting overhead vapors from the Vessel over a sixty minute time interval until the internal pressure of the vessel reached approximately 70 psig. The overhead vapors were condensed, collected, and weighed. The amount of overhead collected weighed approximately 48.6 pounds.

After the concentration step, five pound of water was charged to Vessel 2. The contents of Vessel 2 were then heated, over a 20 minute time interval, until the final internal temperature of the Vessel reached approximately 540° F. At this point, the contents of Vessel 2 were transferred, over a 65 minute time interval, across a flash valve into a blender (i.e., Vessel 3), which was maintained at 465° F. to produce a particulate resin. The total amount of material collected overhead from the material flashed into Vessel 3 from Vessel 2 weighed approximately 281 pounds. The amount of material remaining in Vessel 3 weighed approximately 212 pounds.

The contents of Vessel 3 were then blended at 465° F., in the substantial absence of a gaseous oxidizing atmosphere, for approximately 120 minutes. The particulate resin contained in Vessel 3 was then separated, washed and dried. The total amount of polymer recovered from Vessel 3 weighed approximately 72 pounds. This resin will henceforth be referred to as Resin 1.

A sample of Resin 1 was then taken to determine its flow rate, its loose bulk density, and its compacted bulk density. These values are recorded in Table I.

In order to demonstrate the effectiveness of this invention, a control resin (i.e., Resin 2) was prepared in the following manner.

Into a steam-heated mixing vessel (i.e., Vessel 1) 79.3 pounds of a 47.2 weight percent aqueous sodium hydroxide solution and 88.5 pounds of an aqueous solution containing 58.6 weight percent sodium hydrosulfide and 0.2 weight percent sodium hydroxide were charged.

To a dehydration/polymerization vessel (i.e., Vessel 2) 15.7 gallons of N-methyl-2-pyrrolidone (i.e., NMP) and 23.5 pounds of sodium acetate were then charged.

The contents of Vessel 1 were then thoroughly mixed and subsequently flushed into Vessel 2 using 18 gallons of NMP. Vessel 2 was then sealed.

While stirring, Vessel 2 was heated to 333° F. The contents therein were then permitted to reflux to insure a proper mixing. After the refluxing period, the contents of Vessel 2 were dehydrated by heating the Vessel to 453° F. and venting the overhead vapors over a 103 minute period. The overhead vapors were then condensed, collected and weighed. The amount of overhead collected, which comprised predominantly water and NMP, weighed approximately 75.6 pounds.

After the dehydration process, the internal temperature of Vessel 2 was permitted to cool to 440° F. at which time 134.2 pounds 1,4-dichlorobenzene was charged therein. The contents of Vessel 2 were then heated to and maintained at 450° F. for approximately 120 minutes.

After the 120 minute hold period, the contents of Vessel 2 were again heated at a rate of approximately 1° F./minute until the final internal temperature and pressure of Vessel 2 reached approximately 510° F. and 155 psig, respectively. The contents of Vessel 2 were then maintained at this temperature and pressure for approximately 60 minutes.

At this point, 0.5 pounds of TCB and 2 gallons of NMP were charged therein and carbon dioxide was pressured into the reactor until the gauge pressure was 30 psig higher than before the start of the addition of the carbon dioxide. After this, the temperature was maintained at 510° F. for an additional 30 minutes.

After the 30 minute hold period, the contents of Vessel 2 were concentrated by venting overhead vapors from the Vessel over a sixty minute time interval until the internal pressure of the vessel reached approximately 70 psig. The overhead vapors were then condensed, collected and weighed. The amount of overhead collected weighed approximately 100.7 pounds.

After the concentration step, five pounds of water was charged to Vessel 2. The contents of Vessel 2 were heated, over a 32 minute time interval, until the final internal temperature of the Vessel reached approximately 540° F.

At this point, the contents of Vessel 2 were transferred, over a 54 minute time interval, across a flash valve into a blender (i.e., Vessel 3), which was maintained at 465° F. to produce a particulate resin. The total amount of material collected overhead from the material flashed into Vessel 3 from Vessel 2 weighed approximately 197.9 pounds. The amount of material remaining in Vessel 3 weighed approximately 257 pounds.

The contents of Vessel 3 were then blended at 465° F., in the substantial absence of a gaseous oxidizing atmosphere, for approximately 120 minutes. The particulate resin contained in Vessel 3 was then separated, washed and dried. The total amount of polymer recovered from Vessel 3 weighed approximately 94 pounds. As stated earlier, this control resin is referred to as Resin 2.

A sample of control Resin 2 was then taken to determine its flow rate, its loose bulk density and its compacted bulk density. These values are recorded in Table I.

TABLE I

Effect of Sodium Acetate on the Melt Flow and Bulk Density of a Poly(Phenylene Sulfide) Resin

| Resin No. | Pound-Moles of Sodium Acetate | Melt Flow (g/10 min.) | Bulk Density (lbs/ft$^3$) | |
|---|---|---|---|---|
| | | | Loose | Compacted |
| 1 (Inventive) | 0.024 | 51 | 30.7 | 36.1 |
| 2 | 0.287 | 49 | 18.5 | 22.6 |

TABLE I-continued

| | | | Bulk Density (lbs/ft$^3$) | |
|---|---|---|---|---|
| Resin No. | Pound-Moles of Sodium Acetate | Melt Flow (g/10 min.) | Loose | Compacted |
| (Control) | | | | |

When comparing the data of Resin 1 and Resin 2, as recorded in Table I, it can clearly be seen that decreasing the amount of sodium acetate by ten fold in conjunction with the inventive process results in increasing the resin's compacted bulk density by 62% and the resin's loose bulk density by 66%. As stated earlier, a resin having an increased bulk density is commercially desirable.

EXAMPLE II

This example demonstrates a process for preparing a novel polymeric resin by employing low levels of an alkali metal carboxylate and a controlled amount of water. The alkali metal carboxylate employed in this example was sodium acetate.

The novel PAS resin prepared in this example was a poly(phenylene sulfide) (i.e., PPS) resin. The novel process in which the PPS was prepared as follows.

Into a steam-heated mixing vessel (i.e., Vessel 1), 71.7 pounds of a 49.9 weight percent aqueous sodium hydroxide solution and 86.2 pounds of an aqueous solution, containing 60.2 weight percent sodium hydrosulfide and 0.2 weight percent sodium hydroxide, were charged.

To a dehydration/polymerization vessel (i.e., Vessel 2), 17.1 gallons of N-methyl-2-pyrrolidone (i.e., NMP) was then charged.

The contents of Vessel 1 were thoroughly mixed and subsequently flushed into Vessel 2 using 18 gallons of NMP. Vessel 2 was then sealed.

While stirring, Vessel 2 was heated to 304° F. The contents therein were then permitted to reflux to insure a proper mixing. After the refluxing period, the contents of Vessel 2 were dehydrated by heating the Vessel to 396° F. and venting the overhead vapors over a 73 minute period. The overhead vapors were then condensed, collected and weighed. The amount of overhead collected, which comprised predominantly water and NMP, weighed approximately 64 pounds.

After the dehydration process, the internal temperature of Vessel 2 was increased to 409° F. at which time 135.3 pounds 1,4-dichlorobenzene were charged therein. The contents of Vessel 2 were then heated at a rate of approximately 1.5° F./minute until the final internal temperature and pressure of Vessel 2 reached 440° F. and 38 psig, respectively. The contents of Vessel 2 were maintained at this temperature for approximately 180 minutes, at which time the pressure was 87 psig.

After the 180 minute hold period, 2.3 pounds of sodium acetate, 3.4 pounds of water, and 1 gallon of NMP were charged into Vessel 2. The contents of Vessel 2 were then heated at a rate of approximately 3° F./minute until the final internal temperature and pressure of Vessel 2 reached approximately 508° F. and 224 psig, respectively. The contents of Vessel 2 were maintained at this temperature and pressure for approximately 90 minutes.

After the 90 minute hold period, the contents of Vessel 2 were concentrated by venting overhead vapors from the Vessel over a sixty minute time interval until the internal pressure of the vessel reached approximately 70 psig. The overhead vapors were condensed, collected, and weighed. The amount of overhead collected weighed approximately 52 pounds.

After the concentration step, five pounds of water was charged to Vessel 2. The contents of Vessel 2 were then heated, over a 15 minute time interval, until the final internal temperature of the Vessel reached approximately 540° F. The internal temperature was maintained at 540° F. for approximately 52 minutes. At this point, the contents of Vessel 2 were transferred, over a 64 minute time interval, across a flash valve into a blender (i.e., Vessel 3) which was maintained at 465° F. to produce a particulate resin. The total amount of material collected overhead from the material flashed into Vessel 3 from Vessel 2 weighed approximately 267.9 pounds. The amount of material remaining in Vessel 3 weighed approximately 228.7 pounds.

The contents of Vessel 3 were then blended at 465° F., in the substantial absence of a gaseous oxidizing atmosphere, for approximately 120 minutes. The particulate resin contained in Vessel 3 was then separated, washed and dried. The total amount of polymer recovered from Vessel 3 weighed approximately 83 pounds. This resin will henceforth be referred to as Resin 3.

A sample of Resin 3 was then taken to determine its flow rate and its loose bulk density. These values are recorded in Table II.

In order to demonstrate the effectiveness of this invention, a control resin (i.e., Resin 4) was prepared in the following manner.

Into a steam-heated mixing vessel (i.e., Vessel 1), 76.1 pounds of a 47.1 weight percent aqueous sodium hydroxide solution and 88.2 pounds of an aqueous solution containing 58.8 weight percent sodium hydrosulfide and 0.2 weight percent sodium hydroxide were charged.

To a dehydration/polymerization vessel (i.e., Vessel 2), 18.2 gallons of NMP and 23.0 pounds of sodium acetate were then charged.

The contents of Vessel 1 were then thoroughly mixed and subsequently flushed into Vessel 2 using 18 gallons of NMP. Vessel 2 was then sealed.

While stirring, Vessel 2 was heated to 302° F. The contents therein were then permitted to reflux to insure a proper mixing. After the refluxing period, the contents of Vessel 2 were dehydrated by heating the Vessel to 407° F. and venting the overhead vapors over a 97 minute period. The overhead vapors were then condensed, collected and weighed. The amount of overhead collected, which comprised predominantly water and NMP, weighed approximately 71.3 pounds.

After the dehydration process, the internal temperature of Vessel 2 was permitted to cool to 402° F. at which time 137.4 pounds 1,4-dichlorobenzene was charged therein. The contents of Vessel 2 were then heated, at a rate of approximately 1.6° F./minute until the final internal temperature and pressure of Vessel 2 reached 450° F. and 41 psig, respectively. The contents of Vessel 2 were then maintained at this temperature for approximately 170 minutes, at which time the pressure was 75 psig.

After the 170 minute hold period, the contents of Vessel 2 were again heated at a rate of approximately 3° F./minute until the final internal temperature and pressure of Vessel 2 reached approximately 510° F. and 151 psig, respectively. The contents of Vessel 2 were then maintained at this temperature and pressure for approximately 61 minutes.

After the 61 minute hold period, 30 psig of carbon dioxide gas was charged into Vessel 2 until the pressure was 30 psig higher than before the start of the addition of the carbon dioxide. The contents of Vessel 2 were then maintained at 510° F. for an additional 30 minutes. The contents of Vessel 2 were then concentrated by venting overhead vapors from the Vessel over a 55 minute time interval until the internal pressure of the vessel reached approximately 70 psig. The overhead vapors were condensed, collected and weighed. The amount of overhead collected weighed approximately 29.4 pounds.

After the concentration step, five pounds of water was charged to Vessel 2. The contents of Vessel 2 were then heated, over a 15 minute time interval, until the final internal temperature of the Vessel reached approximately 540° F. The internal temperature of the vessel was maintained at 537° F. approximately 33 minutes.

At this point, the contents of Vessel 2 were transferred, over a 65 minute time interval, across a flash valve into a blender (i.e., Vessel 3), which was maintained at 465° F., to produce a particulate resin. The total amount of material collected overhead from the material flashed into Vessel 3 from Vessel 2 weighed approximately 276.7 pounds. The amount of material remaining in Vessel 3 weighed approximately 256.8 pounds.

The contents of Vessel 3 were then blended at 465° F., in the substantial absence of a gaseous oxidizing atmosphere, for approximately 120 minutes. The particulate resin contained in Vessel 3 was then separated, washed and dried. The total amount of polymer recovered from Vessel 3 weighed approximately 70 pounds. As stated earlier, this control resin is referred to as Resin 4.

A sample of control Resin 4 was then taken to determine its flow rate and its loose bulk density. These values are recorded in Table II.

TABLE II

Effect of Sodium Acetate Level and Level During Polymerization of Water on the Melt Flow and Bulk Density of Poly(Phenylene Sulfide) Resin

| Resin No. | Pound-Moles of Sodium Acetate | Pound-Moles of Water[a] | Melt Flow (g/10 min) | Loose Bulk Density (lbs/ft$^3$) |
|---|---|---|---|---|
| 3 (Inv.) | 0.028 | 1.089 | 401 | 27.3 |
| 4 (Control) | 0.28 | 0.9 | 356 | 18.0 |

[a]Total water present during polymerization process, which is the molar sum of (1) water present after dehydration step but before initiation of polymerization process (i.e., approximately zero) (2) water produced during polymerization process (i.e., approximately 0.9 pound-mole), and (3) water added to polymerization mixture after dehydration process.

When comparing the data of Resin 3 and Resin 4, as recorded in Table II, it can clearly be seen that, while employing relatively small amounts of sodium acetate and controlling the level of water present during polymerization, produces a polymer with flow rate very similar to that of Resin 4, this same process results in increasing the Resin's bulk density by approximately 52% compared to that of Resin 4. As stated earlier, a resin having an increased bulk density is often commercially desirable.

EXAMPLE III

This example compares the physical properties of a polymer composition made from Resin 1 prepared in Example I, with those of a similar polymer composition employing a solid-state cured PPS resin, PR06, commercially available from Phillips 66 Company as Ryton ® poly(phenylene sulfide) having a melting point of 285° C. (515° F.) and a melt flow value, after the curing process, of approximately 90-175 g/10 min.

For this comparison, two 40 weight percent fiberglass reinforced injection molding compounds were prepared, differing substantially only in the preparation method used to make the PPS component of the compound. For Composition 1, Resin 1 prepared in Example I was used. For Composition 2, a commercially available solid-state cured PSS made essentially by the techniques disclosed in U.S. Pat. No. 3,354,129 was used. These compositions were injection molded under substantially the same conditions into standard ASTM test specimens which were then tested according to standard ASTM procedures to produce the results listed in Table III.

TABLE III

Effects of PPS Preparation Method on the Physical Properties of Injection Molding Compound

| ASTM Test | Composition 1 (Invention) | Composition 2 (Control) |
|---|---|---|
| Flexural Modulus (MSI) | 2.2 | 2.1 |
| Flexural Strength (KSI) | 34.2 | 29.7 |
| Tensile Strength (KSI) | 21.2 | 20.4 |
| Izod Impact Strength unnotched (ft. lb./in.) | 8.2 | 5.5 |

The data in Table III demonstrates that the Flexural Strength and the Izod Impact Strength of Composition 1 Made from Resin 1 (Example I) are each superior to those of Composition 2 and that the Flexural Modulus and Tensile Strength are each essentially the same for the two compositions. The most significant improvement is demonstrated by a comparison of the Izod Impact Strength properties. Specifically, when applied to commercial applications, the increased Izod Impact Strength of Composition 1 is highly desirable since many applications demand a resistance to breakage in use of shipping and handling which requires a toughness reflected by the higher Izod Impact Strength of the inventive Composition 1.

It is evident from the foregoing that various modifications which are apparent to those skilled in the art can be made into the embodiments of this invention without departing from the spirit and scope thereof. Having thus described the invention, it is claimed as follows.

That which is claimed is:

1. An arylene sulfide resin prepared by contacting, in a polymerization mixture, during a polymerization process, reactants comprising:
   (a) an alkali metal sulfide,
   (b) an organic amide,
   (c) an alkali metal carboxylate,
   (d) water, and
   (e) a monomer source comprising at least one dihaloaromatic compound, wherein the amount of said alkali metal carboxylate present during said polymerization process ranges from about 0.01 to about 0.03 mole for each mole of sulfur present in resulting said arylene sulfide resin, and wherein the amount of said water present during said polymerization process ranges from about 1.02 to about 2.1 moles for each mole of sulfur present in resulting said arylene sulfide resin.

2. An arylene sulfide resin prepared in accordance with claim 1 wherein resulting said arylene sulfide resin is selected from the group consisting of poly(arylene sulfide), poly(arylene sulfide ketone), and poly(arylene sulfide diketone).

3. An arylene sulfide resin prepared in accordance with claim 2 wherein said poly(arylene sulfide) is poly(phenylene sulfide).

4. An arylene sulfide resin prepared in accordance with claim 2 wherein said poly(arylene sulfide) is poly(biphenylene sulfide).

5. An arylene sulfide resin prepared in accordance with claim 2 wherein said poly(arylene sulfide ketone) is poly(phenylene sulfide ketone).

6. An arylene sulfide resin prepared in accordance with claim 2 wherein said poly(arylene sulfide diketone) is poly(phenylene sulfide diketone).

7. An arylene sulfide resin prepared in accordance with claim 1 wherein the amount of said water present during said polymerization process ranges from about 1.05 to about 2.0 moles for each mole of said sulfur present in resulting said arylene sulfide resin.

8. An arylene sulfide resin prepared in accordance with claim 1 wherein said alkali metal sulfide present during said polymerization process results from an alkali metal sulfide being present in said polymerization mixture prior to the initiation of said polymerization process.

9. An arylene sulfide resin prepared in accordance with claim 8 wherein said alkali metal sulfide present in said polymerization mixture prior to said initiation of said polymerization process is selected from the group consisting of sodium sulfide, potassium sulfide, rubidium sulfide, cesium sulfide and mixtures thereof.

10. An arylene sulfide resin prepared in accordance with claim 9 wherein said alkali metal sulfide present in said polymerization mixture prior to said initiation of said polymerization process comprises sodium sulfide.

11. An arylene sulfide resin prepared in accordance with claim 1 wherein said alkali metal sulfide present during said polymerization process results from a reaction between a sulfur source and a caustic material.

12. An arylene sulfide resin prepared in accordance with claim 11 wherein said sulfur source is selected from the group consisting of alkali metal hydrosulfides, thiosulfates, hydrogen sulfide, carbon disulfide, N-methylpyrrolidine-2-thione, thiolacetic acid, and mixtures thereof, wherein said thiosulfates are selected from the group consisting of lithium thiosulfates, sodium thiosulfates, potassium thiosulfates, rubidium thiosulfates, cesium thiosulfates, magnesium thiosulfates, calcium thiosulfates, strontium thiosulfates, barium thiosulfates, and mixtures thereof, and wherein said caustic material is selected from the group consisting of sodium hydroxide, lithium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof.

13. An arylene sulfide resin prepared in accordance with claim 12 wherein said sulfur source comprises sodium hydrosulfide, and wherein said caustic material comprises sodium hydroxide.

14. An arylene sulfide resin prepared in accordance with claim 1 wherein said organic amide present during said polymerization process is selected from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, N,N'-ethylenedi-2-pyrrolidone, hexamethylphosphoramide, tetramethylurea, and mixtures thereof.

15. An arylene sulfide resin prepared in accordance with claim 14 wherein said organic amide present during said polymerization process is N-methyl-2-pyrrolidone.

16. An arylene sulfide resin prepared in accordance with claim 1 wherein said alkali metal carboxylate present in said polymer reaction mixture during said polymerization process has the formula $$RCO_2M$$

wherein, R is a hydrocarbyl radical having from 1 to about 20 carbon atoms selected from alkyl, cycloalkyl and aryl compounds, and wherein M is an alkali metal selected from the group consisting of lithium, sodium, potassium, rubidium and cesium.

17. An arylene sulfide resin prepared in accordance with claim 16 wherein said R is selected from the group consisting of alkyl radicals having from 1 to about 6 carbon atoms and phenyl radicals, and wherein said M is selected from the group consisting of lithium and sodium.

18. An arylene sulfide resin prepared in accordance with claim 16 wherein said alkali metal carboxylate is selected from the group consisting of lithium acetate, sodium acetate, potassium acetate, lithium propionate, sodium propionate, lithium-20-methylpropionate, rubidium butyrate, lithium valerate, sodium valerate, cesium hexanoate, lithium heptanoate, lithium-2-methyloctanoate, rubidium 4-ethyltetradecanoate, sodium octadecanoate, sodium heneicosanoate, lithium cyclohexanecarboxylate, cesium cyclododecanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and mixtures thereof.

19. An arylene sulfide resin prepared in accordance with claim 18 wherein said alkali metal carboxylate is sodium acetate.

20. An arylene sulfide resin prepared in accordance with claim 1 wherein said at least one dihaloaromatic compound present in said polymerization mixture prior to the initiation of said polymerization process has the formula:

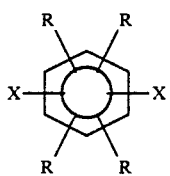

wherein, each X is selected from the group consisting of chlorine, bromine and iodine, and wherein each R is selected from the group consisting of hydrogen and hydrocarbyl radicals.

21. An arylene sulfide resin prepared in accordance with claim 20 wherein the total number of carbon atoms in each molecule of said at least one dihaloaromatic compound formula ranges from about 6 to about 24.

22. An arylene sulfide resin prepared in accordance with claim 20 wherein said at least one dihaloaromatic compound is selected from the group consisting of 1,4-dichlorobenzene, 1,4-dibromobenzene, 1,4-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-benzyl-2,5-dichlorobenzene, 1-octyl-4-(3-methylcyclo-pentyl)-2,5-dichlorobenzene, 1,3-dichloro-benzene, 1,2-dibromobenzene, 1-chloro-3-iodobenzene, 2,4-dichlorotoluene, and mixtures thereof.

23. An arylene sulfide resin prepared in accordance with claim 22 wherein said at least one dihaloaromatic compound is 1,4-dichlorobenzene.

24. An arylene sulfide resin prepared in accordance with claim 1 wherein said monomer source further comprises at least one polyhaloaromatic compound having more than two halogen substituents per molecule, and wherein the amount of said polyhaloaromatic compound initially present ranges from about 0.0001 to about 0.01 mole for each mole of said at least one dihaloaromatic compound present prior to the initiation of said polymerization process.

25. An arylene sulfide resin prepared in accordance with claim 24 wherein the amount of said polyhaloaromatic compound initially present ranges from about 0.001 to about 0.008 mole for each mole of said at least one dihaloaromatic compound present prior to said initiation of said polymerization process.

26. An arylene sulfide resin prepared in accordance with claim 24 wherein said at least one polyhaloaromatic compound has the formula:

$R'X_n$ wherein each x is selected from the group consisting of chlorine, bromine, and iodine; where n is an integer of 3 to 6, wherein R' is a polyvalent aromatic radical of valence n which can have up to about 4 methyl substituents, and wherein the total number of carbon atoms in each said R' range from about 6 to about 16.

27. An arylene sulfide resin prepared in accordance with claim 26 wherein said at least one polyhaloaromatic compound is selected from the group consisting of 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and mixtures thereof.

28. An arylene sulfide resin prepared in accordance with claim 27 wherein said at least one polyhaloaromatic compound is 1,2,4-trichlorobenzene.

29. An arylene sulfide resin prepared in accordance with claim 1 wherein the loose bulk density of resulting said arylene sulfide resin is at least about 20 pounds per cubic foot.

30. An arylene sulfide resin prepared in accordance with claim 29 wherein said loose bulk density of resulting said arylene sulfide resin is at least about 25 pounds per cubic foot.

31. An arylene sulfide resin prepared in accordance with claim 1 wherein the melt flow value of resulting said arylene sulfide resin is less than about 1,000 grams per 10 minutes.

32. An arylene sulfide resin prepared in accordance with claim 31 wherein said melt flow value of resulting said arylene sulfide resin is in the range from about 5 to about 700 grams per 10 minutes.

33. An arylene sulfide resin prepared in accordance with claim 32 wherein said melt flow value of resulting said arylene sulfide resin is in the range from about 10 to about 500 grams per 10 minutes.

34. An arylene sulfide resin prepared by contacting reactants comprising:
 (a) sodium hydrosulfide,
 (b) sodium hydroxide,
 (c) N-methyl-2-pyrrolidone,
 (d) sodium acetate, wherein the amount of said sodium acetate present in said polymerization mixture during said polymerization process ranges from about 0.01 to about 0.03 mole for each mole of sulfur present in resulting said arylene sulfide resin,
 (e) water, wherein the amount of said water present during said polymerization process ranges from about 1.02 to about 2.1 moles for each mole of sulfur present in resulting said arylene sulfide resin, and
 (f) 1,4 dichlorobenzene.

35. An arylene sulfide resin prepared in accordance with claim 34 wherein the amount of said water present during said polymerization process ranges from about 1.05 to about 2.0 moles for each mole of sulfur present in resulting said arylene sulfide resin.

36. An arylene sulfide resin prepared in accordance with claim 34 wherein said polymerization mixture further comprises at least one polyhaloaromatic compound having more than two halogen substituents per molecule, and wherein the amount of said polyhaloaromatic compound initially present ranges from about 0.0001 to about 0.01 mole for each mole of said dihaloaromatic compound present prior to the initiation of said polymerization process.

37. An arylene sulfide resin prepared in accordance with claim 36 wherein said at least one polyhaloaromatic compound has the formula:

$R'X_n$ wherein each X is selected from the group consisting of chlorine, bromine, and iodine; where n is an integer of 3 to 6, wherein R' is a polyvalent aromatic radical of valence n which can have up to about 4 methyl substituents, and wherein the total number of carbon atoms in each said R' range from about 6 to about 16.

38. An arylene sulfide resin prepared in accordance with claim 37 wherein said at least one polyhaloaromatic compound is selected from the group consisting of 1,2,3-trichlorobenzene, 1,2,4-trichloro-benzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and mixtures thereof.

39. An arylene sulfide resin prepared in accordance with claim 38 wherein said at least one polyhaloaromatic compound is 1,2,4-trichlorobenzene.

40. An arylene sulfide resin prepared in accordance with claim 36 wherein said at least one polyhaloaromatic compound is initially present in the range from about 0.001 to about 0.008 mole for each mole of said dihaloaromatic compound present prior to said initiation of said polymerization process.

41. A process for preparing an arylene sulfide resin comprising the steps of:
   (a) preparing, in an enclosed vessel, a first mixture heating to a temperature of at least about 100° C., wherein said first mixture comprises a sulfur source, a caustic material, an organic amide, an alkali metal carboxylate, and water, wherein the amount of said alkali metal carboxylate present in said first mixture ranges from about 0.01 to about 0.03 mole for each mole of sulfur present in resulting said arylene sulfide resin;
   (b) venting vapors from said enclosed vessel to remove free water and form an at least partially dehydrated mixture;
   (c) adding to said at least partially dehydrated mixture reactants comprising water and a monomer source, wherein said monomer source comprises at least one dihaloaromatic compound, to form a polymerization mixture, wherein the amount of said water added to said dehydrated mixture is sufficient to result in the total amount of water, in said polymerization mixture during said polymerization process, being present in an amount ranging from about 1.02 to about 2.1 moles for each mole of sulfur present in resulting said arylene sulfide resin, and wherein said total amount of said water present in said polymerization mixture during said polymerization process is the molar sum of (1) the moles of said free water present in said dehydrated mixture prior to step (c), (2) the moles of said water added to said at least partially dehydrated mixture during step (c), and (3) the moles of water produced during the polymerization process; and
   (d) heating said polymerization mixture to an elevated temperature for a time sufficient to form said arylene sulfide resin.

42. A process in accordance with claim 41 wherein said sulfur source is selected from the group consisting of alkali metal hydrosulfides, thiosulfates, hydrogen sulfide, carbon disulfide, N-methyl pyrrolidine-2-thione, thiolacetic acid, and mixtures thereof, wherein said thiosulfates are selected from the group consisting of lithium thiosulfates, sodium thiosulfates, potassium thiosulfates, rubidium thiosulfates, cesium thiosulfates, magnesium thiosulfates, calcium thiosulfates, strontium thiosulfates, barium thiosulfates, and mixtures thereof, and wherein said caustic material is selected from the group consisting of sodium hydroxide, lithium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof.

43. A process in accordance with claim 42 wherein said sulfur source comprises sodium hydrosulfide, and wherein said caustic material comprises sodium hydroxide.

44. A process in accordance with claim 41 wherein the amount of said water added to said at least partially dehydrated mixture is sufficient to result in the total amount of water, in said polymerization mixture during said polymerization process, being present in an amount ranging from about 1.05 to about 2.0 moles for each mole of sulfur present in resulting said arylene sulfide resin.

45. A process in accordance with claim 41 wherein said monomer source further comprises at least one polyhaloaromatic compound having more than two halogen substituents per each molecule, and wherein the amount of said polyhaloaromatic compound initially present ranges from about 0.0001 to about 0.01 mole for each mole of said dihaloaromatic compound present prior to step (d).

46. A process in accordance with claim 45 wherein said at least 1 polyhaloaromatic compound is selected from the group consisting of 1,2,3-trichlorobenzene, 1,2,4-trichloro-benzene, 1,3-dichloro-5-bromobenzene, 1,2,4-triiodobenzene, 1,2,3,5-tetrabromobenzene, 2,2',4,4'-tetrachlorobiphenyl, 2,2',5,5'-tetraiodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and mixtures thereof.

47. A process in accordance with claim 41 wherein at least one polyhaloaromatic compound having more than two halogen substituents per molecule is added to said polymerization mixture after step (c), and wherein the amount of said polyhaloaromatic compound initially present ranges from about 0.0001 to about 0.01 mole for each mole of said dihaloaromatic compound present prior to step (d).

48. A process in accordance with claim 41 wherein said organic amide is selected from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, N,N'-ethylenedi-2-pyrrolidone, hexamethyl-phosphoramide, tetramethylurea, and mixtures thereof.

49. A process in accordance with claim 48 wherein said organic amide is N-methyl-2-pyrrolidone.

50. A process in accordance with claim 41 wherein said alkali metal carboxylate is selected from the group consisting of lithium acetate, sodium acetate, potassium acetate, lithium propionate, sodium propionate, lithium-2-methylpropionate, rubidium butyrate, lithium valerate, sodium valerate, cesium hexanoate, lithium heptanoate, lithium-2-methyloctanoate, rubidium 4-ethyltetradecanoate, sodium octadecanoate, sodium heneicosanoate, lithium cyclohexanecarboxylate, cesium cyclododecanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and mixtures thereof.

51. A process in accordance with claim 50 wherein said alkali metal carboxylate is sodium acetate.

52. A process in accordance with claim 41 wherein said at least one dihaloaromatic compound is selected from the group consisting of 1,4-dichlorobenzene, 1,4-dibromobenzene, 1,4-diiodobenzene, 1-chloro-4-bromobenzene, 1-chloro-4-iodobenzene, 1-bromo-4-iodobenzene, 2,5-dichlorotoluene, 2,5-dichloro-p-xylene, 1- ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-benzyl-2,5-dichlorobenzene, 1-octyl-4-(3-methylcyclopentyl)-2,5-dichlorobenzene, 1,3-dichlorobenzene, 1,2-dibromobenzene, 1-chloro-3-iodobenzene, 2,4-dichlorotoluene, and mixtures thereof.

53. A process in accordance with claim 52 wherein said at least one dihaloaromatic compound is 1,4-dichlorobenzene.

54. A process in accordance with claim 41 wherein prior to step (b), said first mixture is heated to at least 125° C.

55. A process in accordance with claim 41 wherein, during step (d), said polymerization mixture is heated to a temperature in the range from about 180° C. to about 285° C. for a period of time ranging from about 1 hour to about 60 hours.

56. A process in accordance with claim 55 wherein, during step (d), said polymerization mixture is heated to a temperature in the range from about 190° C. to about 275° C. for a period of time ranging from about 2 hours to about 10 hours.

57. A process in accordance with claim 41 wherein, during step (d), said polymerization mixture is heated to a first elevated temperature in the range from about 180° C. to about 245° C. and maintained at said first elevated temperature for a first period of time, and after said first period of time, said polymerization mixture is heated to a second elevated temperature in the range from about 245° C. to about 275° C. and maintained at said second elevated temperature for a second period of time, wherein the total sum of said first period of time and said second period of time ranges from about 1 hour to about 60 hours.

58. A process in accordance with claim 57 wherein, during step (d), said polymerization mixture is heated to a first elevated temperature in the range from about 190° C. to about 245° C. and maintained at said first elevated temperature for a first period of time, and after said first period of time, said polymerization mixture is heated to a second elevated temperature in the range from about 266° C. to about 275° C. and maintained at said second elevated temperature for a period of time, wherein the total sum of said first period of time and said second period of time ranges from about 2 hours to about 10 hours.

* * * * *